United States Patent
Zimmerman et al.

(10) Patent No.: US 6,495,722 B1
(45) Date of Patent: Dec. 17, 2002

(54) MANNICH POLYOLS FOR RIGID SPRAY FOAMS

(75) Inventors: Robert L. Zimmerman, Austin, TX (US); Marshall P. Devine, Austin, TX (US); Patrick L. Weaver, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/953,776

(22) Filed: Sep. 17, 2001

(51) Int. Cl.$^7$ .............................................. C07C 217/00
(52) U.S. Cl. ..................... 564/346; 564/360; 564/361; 564/384; 564/389; 521/163; 521/164; 521/167
(58) Field of Search .................. 521/163, 164, 521/167; 564/346, 360, 361, 384, 389

(56) References Cited

U.S. PATENT DOCUMENTS 4,383,102 A    5/1983  McDaniel et al. .......... 528/107
6,281,393 B1   8/2001  Molina et al. .............. 568/607

FOREIGN PATENT DOCUMENTS

| EP | 0 398 147 | 11/1994 | ............... C08J/9/14 |
| JP | 173826 | 11/1990 | ........... C08G/18/48 |
| WO | WO 0015690 | 9/1999 | ........... C08G/65/26 |

Primary Examiner—Samuel Barts
(74) Attorney, Agent, or Firm—Russ R. Stolle; Ron D. Brown; Christopher J. Whewell

(57) ABSTRACT

Provided herein are polyurethane foams which may be prepared by spray techniques. The foams of the invention are prepared using conventional isocyanates and a novel Mannich condensate polyol having a hydroxy number in the range of 250–340 and a viscosity of 3500 cps or less, and wherein the Mannich condensate polyol is derived from nonylphenol, formaldehyde, an alkanolamine, and propylene oxide as the sole alkoxylating agent. Polyurethane foams prepared according to the invention possess superior physical properties over sprayed polyurethane foams prepared using Mannich condensate polyols which are made using mixtures of propylene oxide and ethylene oxide.

12 Claims, No Drawings

MANNICH POLYOLS FOR RIGID SPRAY FOAMS

FIELD OF THE INVENTION

The present invention relates to foamed products produced by admixture of an isocyanate with a polyol which is a Mannich condensate. More particularly, the invention relates to Mannich condensates useful for producing foams, wherein the Mannich condensates possess physical properties which render them useful in conventional spray equipment, and which properties yield foam products which are physically useful in applications where analogous foams made with prior art Mannich condensate polyols fail.

BACKGROUND INFORMATION

When it is desired to prepare polyurethane foams which are blown using water only as a blowing agent, or mixtures of water and auxiliary blowing agents, it is found that the Mannich polyols available in the prior art are either too viscous to be used in spray equipment or do not provide foams with good physical properties.

WO 00/156690 discloses Mannich polyols with viscosities of 300–3500 cps. The technology therein uses a mixture of ethylene oxide and propylene oxide as alkoxylating agent. U.S. Pat. No. 6,281,393 is similar to WO 00/156690. Japan Kokai 173826 (1992) Mannich polyols with a hydroxyl number in the range of between 350–500. The technology therein uses a mole ratio of phenolic to formaldehyde of 1:2.1–3 and 20–50% (wt.) ethylene oxide. U.S. Pat. No. 4,383,102 provides low viscosity Mannich polyols using a mixture of ethylene oxide and propylene oxide (as alkoxylating agent). The entire contents of each of these patents and publications are herein incorporated by reference thereto.

SUMMARY OF THE INVENTION

The present invention relates to a foamed product which is formed from the admixture of: a first component comprising an organic isocyanate and a second component comprising a Mannich polyol. The Mannich polyol has a hydroxy number in the range of 250–340 and a viscosity of 3500 cps or less. The Mannich polyol is derived from nonylphenol, formaldehyde, an alkanolamine, and propylene oxide as the sole alkoxylating agent. The invention also relates to the Mannich polyols which are disclosed.

The Mannich condensate polyol product useful according to the invention comprises a mixture of:

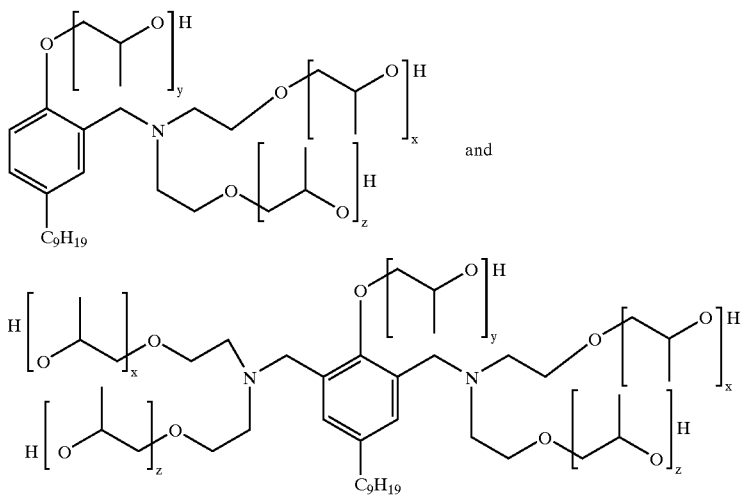

, said mixture being derived from:
a) nonylphenol,
b) formaldehyde,
c) an alkanolamine selected from the group consisting of: diethanolamine, or mixtures of diethanolamine with monoethanolamine; and
d) propylene oxide as the sole alkoxylating agent, wherein said mixture has a hydroxy number in the range of 250–340 and a viscosity of 3500 cps or less. Preferably, the ratio of MONO/DI in the above mixture is any ratio in the range of between 10/90 to 70/30.

DETAILED DESCRIPTION OF THE INVENTION

The present invention provides Mannich polyols prepared from nonylphenol, formaldehyde, ethanolamines, and propylene oxide as the sole alkoxylating agent. The Mannich polyols of the invention have a hydroxy number in the range of 250–340 and a viscosity of 3500 cps or less. The invention also relates to polyurethane spray foams prepared from these polyols and an organic isocyanate such as MDI, TDI, aliphatic isocyanates, or polymeric forms of any of these.

The polyols of this invention are useful in preparing rigid spray urethane foams. The polyols of this invention allow for good water blown or partially water blown spray foams to be prepared. They also have improved hydrocarbon solubility and HCFC solubility thus allowing for wide formulating parameters. Prior art polyols suffer from high viscosity, and produce foams having poor properties.

The lower viscosity of the polyols of this invention enable preparation of components having suitable viscosities for forming end use products using spray techniques, i.e., spray foams. If the viscosity is too high, the pumps used in association with the spraying can cavitate or poor mixing of the A-component (isocyanate) and B-component occurs, thus forming inferior or unusable products. The polyols of this invention also give improved solubility of auxiliary blowing agents like 134a and isopentane. Finally the foams produced from these polyols have superior physical properties, i.e. dimensional stabilities and inter laminar adhesion. Both of these are unexpected, especially the inter laminar adhesion.

This invention is concerned with Mannich condensate polyols having a relatively low hydroxyl number and relatively low viscosity which are made using propylene oxide as the sole alkoxylating agent, and not a mix of propylene oxide and ethylene oxide as taught in the prior art. The invention is also concerned with the use of such Mannich condensate polyols in all-water blown or partially water blown rigid polyurethane foams. The Mannich condensate polyols of the invention are prepared from nonylphenol, formaldehyde, an alkanolamine (which may be neat diethanolamine, or a mixture of diethanolamine with monoethanolamine), and propylene oxide. The procedure for preparing a Mannich condensate polyol according to the invention is set forth in the examples. The preferred hydroxyl number range for a Mannich condensate polyol prepared according to the invention is 250–340, with the most preferred being in the range of 290–330. The viscosity of a Mannich condensate polyol according to the invention is less than 3500 cps with the preferred range being any value in the range of 1500 to 3000 cps.

The rigid urethane foams are ones that are either "all water blown", or use water as the primary blowing agent, which in the former case means that all of, and in the latter case means that at least 50% of the gas used in generating the foam cells is derived from carbon dioxide that is generated from the reaction of isocyanate with water that is present in the formulation.

The polyols made using propylene oxide as the sole alkoxylating agent according to the invention provide all water blown foams that were dimensionally stable, while prior art polyols that used both ethylene oxide and propylene oxide do not possess good dimensional stability. Further, the all water blown foams resulting from the use of the polyols of this invention gave extremely good inter laminar adhesion (adhesion between separate foam layers).

Examples I-A, I-B, and I-C illustrate the preparation of Mannich condensate polyols according to the invention. Examples II and III show preparation of similar polyols which are made using a mixture of both ethylene oxide and propylene oxide as the alkoxylating agent

EXAMPLE I

Jacketed, pressure vessels (kettles) in the 13–170 gallon volume range and provided with mechanical agitation were used to prepare samples. Each kettle was equipped with a heating/cooling jacket with thermocouple, an internal thermocouple for the process liquid phase, a pressure gauge, connections (top and bottom) to a pressurized (90 psi) nitrogen supply, vent connection to a vacuum pump, vent connection to a fume oxidizer, and material transfer ports (top and bottom).

Nonylphenol and diethanolamine (or an amine blend consisting of 97 parts by weight diethanolamine and 3 pbw ethanolamine) were charged to the kettle, sealed, purged with nitrogen, and heated with stirring to 113–133° C., whereupon a solution of 55% (wt.) formaldehyde in methanol was added over a period of 7–99 minutes while maintaining a reaction temperature of 113–138° C. After the methanolic formaldehyde addition, the reaction mixture was held at 126–140° C. for 42–91 minutes. Subsequently, the mixture was vacuum-stripped at 109–119° C. to a water content of 0.32–0.49 wt. %.

The resulting Mannich condensate was catalyzed with N,N-dimethylethanolamine ("DMEA") and heated to 88–97° C. Then, propylene oxide was added over a period of 2.6–12.0 hours while maintaining a reaction temperature in the range of 88–107° C. After the addition of propylene oxide, the reaction mixture was maintained in the same temperature range for 3.2–12.3 hours.

Subsequently, the mixture was nitrogen-stripped at atmospheric pressure and 80–95° C. for 25–42 minutes, then sampled and analyzed for its hydroxyl number value, which is obtained by dividing 56,100 by the equivalent weight of the polyol. If the hydroxyl value was deemed too high for a desired use, more propylene oxide was added and digested as above before stripping and sampling, and the product was analyzed again. When the hydroxyl value was in the acceptable range, the reaction mixture was vacuum-stripped at 123–135° C. for at least 60 minutes, then stripped further until the water content was less than 0.075% (wt.).

The following table shows the properties of three Mannich condensate polyols prepared in accordance with the foregoing, including the amounts of reactants employed in each case:

TABLE I

|  | Example No. | | |
| --- | --- | --- | --- |
|  | I-A | I-B | I-C |
| RAW MATERIAL CHARGES [pbw] | | | |
| Nonylphenol | 100 | 100 | 100 |
| Diethanolamine | 93 | 93 | 93 |
| Ethanolamine | 2.8 | 2.9 | 2.9 |
| Formaldehyde | 20 | 20 | 20 |
| DMEA catalyst | 1.4 | 2.8 | 2.7 |
| Propylene Oxide | 298 | 357 | 297 |
| PROPERTIES | | | |
| Hydroxyl Value [mg-KOH/g] | 340 | 315 | 335 |
| Viscosity at 25 C. [cP] | 3,480 | 2,500 | 2,550 |

EXAMPLE II

A Mannich condensate prepared as in Example I was catalyzed with DMEA and heated to 88–94° C., then propylene oxide was added over a period of 1.1–2.3 hours while maintaining a reaction temperature of 88–98° C. After propylene oxide addition, the reaction mixture was held at 90–95° C. for 1.5–4.3 hours. Subsequently, the mixture was nitrogen-stripped at atmospheric pressure and 89–95° C. for 15–31 minutes, then it was vacuum-stripped at 90–95° C. for 10–70 minutes. The amounts of reactants used are set forth in Table II.

Ethylene oxide was added to the reaction mixture over a period of 0.1–1.8 hours while maintaining a reaction temperature of 88–98° C. After ethylene oxide addition, the reaction mixture was held at 89–96° C. for 1.2–2.2 hours.

Subsequently, the mixture was nitrogen-stripped at barometric pressure and 89–95° C. for 30–55 minutes, then sampled and analyzed for hydroxyl value. If the hydroxyl value was deemed too high, more propylene oxide was added and digested before stripping, sampling, and analyzing the reaction mixture again. When the hydroxyl value was satisfactory, the reaction mixture was vacuum-stripped at 129–135° C. for at least 60 minutes then stripped further until the water content was less than 0.075 wt. %.

TABLE II

|  | Example No. | | |
| --- | --- | --- | --- |
|  | II-A | II-B | II-C |
| RAW MATERIAL CHARGES [pbw] | | | |
| Nonylphenol | 100 | 100 | 100 |
| Diethanolamine | 93 | 93 | 93 |
| Ethanolamine | 2.9 | 2.8 | 2.8 |
| Formaldehyde | 27 | 27 | 27 |
| DMEA catalyst | 2.4 | 2.6 | 3.8 |
| Propylene Oxide | 117 | 201 | 280 |
| Ethylene Oxide | 151 | 67 | 50 |
| EO/(EO + PO) [wt. %] | 56.4 | 25.0 | 15.1 |
| EO/(EO + PO) [mol %] | 63.0 | 30.5 | 19.0 |
| PROPERTIES | | | |
| Hydroxyl Value [mg-KOH/g] | 297 | 306 | 298 |
| Viscosity at 25 C. [cP] | 1,660 | 2,630 | 2,780 |

EXAMPLE III

A Mannich condensate prepared as in Example I was catalyzed with DMEA and heated to 87–89° C., then a blend of propylene oxide and ethylene oxide (comprised of 5 pbw PO and 1 pbw EO) was added over a period of 2.2 hours while maintaining a reaction temperature of 90–100° C. After the mixed oxide addition, the reaction mixture was held at 90–95° C. for 2.0–2.8 hours. Subsequently, the mixture was nitrogen-stripped at atmospheric pressure and 90–95° C. for 9–15 minutes, then it was vacuum-stripped at 89–95° C. for 45–49 minutes. The amounts of reactants used are set forth in Table III.

Ethylene oxide was added to the reaction mixture over a period of 2–10 minutes while maintaining a reaction temperature of 86–96° C. After ethylene oxide addition, the reaction mixture was held at 86–97° C. for 50–98 minutes.

Subsequently, the mixture was nitrogen-stripped at atmospheric pressure and 90–95° C. for 30–34 minutes, then sampled and analyzed for hydroxyl value. If the hydroxyl value was deemed too high, more propylene oxide was added and digested before stripping, sampling, and analyzing the reaction mixture again. When the hydroxyl value was satisfactory, the reaction mixture was vacuum-stripped at 130–135° C. for at least 60 minutes then stripped further until the water content was less than 0.075 wt. %.

TABLE III

|  | Example No. | |
| --- | --- | --- |
|  | III-A | III-B |
| RAW MATERIAL CHARGES [pbw] | | |
| Nonylphenol | 100 | 100 |
| Diethanolamine | 93 | 93 |
| Ethanolamine | 2.9 | 2.8 |
| Formaldehyde | 27 | 27 |
| DMEA catalyst | 3.2 | 3.2 |
| Propylene Oxide in Blend | 175 | 209 |
| Ethylene Oxide in Blend | 35 | 42 |
| Ethylene Oxide, Neat | 69 | 28 |
| EO/(EO + PO) [wt. %] | 37.2 | 25.0 |
| EO/(EO + PO) [mol %] | 43.9 | 30.5 |
| PROPERTIES | | |
| Hydroxyl Value [mg-KOH/g] | 303 | 306 |
| Viscosity at 25 C. [cP] | 1,970 | 2,530 |

Examples IV–XIII below show preparation of foams and foam properties. The foams were prepared using a Gusmer H-2000 spray machine operating at 1500 psig, 120–130F and using a GX-7 spray gun.

TABLE IV

|  | Example | | | | | | |
| --- | --- | --- | --- | --- | --- | --- | --- |
|  | IV | V | VI | VII | VIII | IX | X |
| B-Component | | | | | | | |
| Polyol I-A | 54.70 | | | | | | |
| Polyol I-B |  | 54.70 | | | | | |
| Polyol II-A |  |  | 54.70 | | | | |
| Polyol II-B |  |  |  | 54.70 | | | |
| Polyol II-C |  |  |  |  | 54.70 | | |
| Polyol III-A |  |  |  |  |  | 54.70 | |
| Polyol III-B |  |  |  |  |  |  | 54.70 |
| JEFFOL ® G-120 | 12.00 | 12.00 | 12.00 | 12.00 | 12.00 | 12.00 | 12.00 |
| Glycerine | 3.00 | 3.00 | 3.00 | 3.00 | 3.00 | 3.00 | 3.00 |
| JEFFOL ® A-800 | 10.00 | 10.00 | 10.00 | 10.00 | 10.00 | 10.00 | 10.00 |
| FYROL ® PCF | 12.00 | 12.00 | 12.00 | 12.00 | 12.00 | 12.00 | 12.00 |
| TEGOSTAB ® B-8404 | 1.00 | 1.00 | 1.00 | 1.00 | 1.00 | 1.00 | 1.00 |
| JEFFCAT ® DMEA | 3.00 | 3.00 | 3.00 | 3.00 | 3.00 | 3.00 | 3.00 |
| DABCO ® T-120 | 0.30 | 0.30 | 0.30 | 0.30 | 0.30 | 0.30 | 0.30 |
| Water | 4.00 | 4.00 | 4.00 | 4.00 | 4.00 | 4.00 | 4.00 |
| A-Component | | | | | | | |
| RUBINATE ® M Spray ratio A:B by volume | 1.5:1 | 1.5:1 | 1.5:1 | 1.5:1 | 1.5:1 | 1.5:1 | 1.5:1 |
| Foam properties | | | | | | | |
| Creep | Very slight | Very slight | Very slight | Very slight | Yes | Very slight | Very slight |
| Density pcf | 2.61 | 2.75 | X | X | 2.79 | X | 2.69 |
| Compressive strength psi | 42 | 44 | X | X | 35 | X | 57 |
| Inter laminar adhesion* psi | 55 | 90 | X | X | 38 | X | 27 |
| k-factor, BTU/hr sq ft F | 0.35 | 0.22 | X | X | 0.29 | X | 0.22 |
| % closed cells | 95.2 | 95.0 | X | X | 95.4 | X | 94.3 |
| Dimensional stabilities 1 week 158 F./100% Rel. humidity | | | | | | | |
| Volume, % | 8.9 | 6.4 | X | X | X | X | X |
| Weight, % | −2.2 | −0.1 | X | X | X | X | X |
| Linear, % 200 F. dry | 7.3 | 3.6 | X | X | X | X | X |

TABLE IV-continued

| | Example | | | | | | |
|---|---|---|---|---|---|---|---|
| | IV | V | VI | VII | VIII | IX | X |
| Volume, % | 10.3 | 9.9 | X | X | X | X | X |
| Weight, % | 0.3 | 0.6 | X | X | X | X | X |
| Linear. % | 7.5 | 6.5 | X | X | X | X | X |
| −20 F. dry | | | | | | | |
| Volume, % | 0.2 | 1.2 | X | X | 0.5 | X | X |
| Weight, % | −0.3 | −0.2 | X | X | −0.4 | X | X |
| Linear, wt % | 0.5 | 0.9 | X | X | 0.5 | X | X |

*adhesion between two foam passes with the second pass being spray on top of the first pass 10 minutes after the first pass.
X = foam quality too poor to measure properties.

The above examples show that Mannich polyol made with all propylene oxide gives good foams while those made with a mixture of propylene oxide and ethylene oxide similar to those in WO 00/15690, U.S. Pat. No. 6,281,393 and JP 4173826 gave such poor foams that physical properties could not be measured. Also, the excellent interlaminar adhesion resulting from the polyols of this invention are evidenced by the data set forth for Examples IV and V of Table IV.

These examples show the polyols of this invention can also be used in foams that use both water and an auxiliary-blowing agent.

| | Example | | |
|---|---|---|---|
| | XI | XII | XIII |
| B-Component | | | |
| Polyol I-C | 39.0 | 39.0 | |
| Polyol I-B | | | 39.0 |
| TERATE 352 | 20.0 | 20.0 | 20.0 |
| Glycerine | 3.0 | 3.0 | 3.0 |
| JEFFOL ® G-120 | 5.0 | 5.0 | 5.0 |
| JEFFOL SA-530 | 7.0 | 7.0 | 7.0 |
| FYROL PCF | 10.0 | 10.0 | 10.0 |
| TEGOASTAB B-8408 | 1.0 | 1.0 | 1.0 |
| JEFFCAT ® DMEA | 30. | 3.0 | 3.0 |
| DABCO T-120 | 0.2 | 0.2 | 0.2 |
| Water | 1.8 | 1.8 | 1.8 |
| 245fa | 10.0 | 10.0 | 10.0 |
| A-Component | | | |
| RUBINATE ® M | | | |
| Spray ratio A:B by volume | 1:1 | 1:1 | 1:1 |
| Delay in second pass | 10 minute | None | None |
| Foam Properties | | | |
| Creep | No | No | No |
| Density, pcf | 2.81 | 3.16 | 2.87 |
| Closed cells, % | 93.6 | 92.5 | 95.9 |
| Compressive Strength, psi | 34 | 45 | 48 |
| k-factor | 0.167 | 0.194 | 0.161 |
| Interlaminar adhesion | 58 | 88 | 103 |
| Dimensional Stabilities, 1 week 158 F./100% Rel. humidity | | | |
| Volume, % | 1.0 | 2.4 | 3.8 |
| Weight, % | −1.1 | −0.4 | 0 |
| Linear, % | −0.7 | 1.6 | 2.6 |
| 200 F./dry | | | |
| Volume, % | 0.5 | 1.3 | −0.3 |
| Weight, % | −1.0 | −0.9 | −0.2 |
| Linear, % | 0.6 | 1.0 | −0.3 |
| −20 F./dry | | | |
| Volume, % | −0.5 | −0.3 | 0.2 |
| Weight, % | 0 | 0 | 0 |
| Linear, % | −0.2 | −0.2 | −0.1 |

Another aspect of the present invention is concerned with a Mannich condensate polyol product which comprises a mixture of:

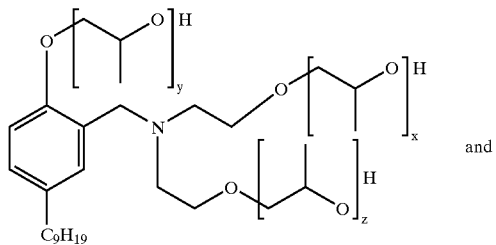

and

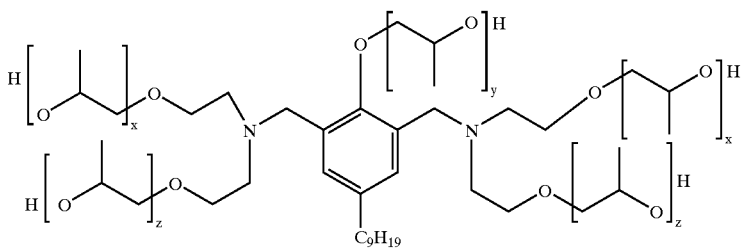

, said mixture being derived from:
  a) nonylphenol,
  b) formaldehyde,
  c) an alkanolamine selected from the group consisting of: diethanolamine, or mixtures of diethanolamine with monoethanolamine; and
  d) propylene oxide as the sole alkoxylating agent, wherein said mixture has a hydroxy number in the range of 250–340 and a viscosity of 3500 cps or less. Preferably, the ratio of MONO/DI in the above mixture is any ratio in the range of between 10/90 to 70/30.

Although this invention has been shown and described with respect to certain preferred embodiments, it is obvious that equivalent alterations and modifications will occur to others skilled in the art upon reading and understanding of this specification and the appended claims. The present invention includes all such modifications and alterations, and is limited only by the scope of the following claims.

What is claimed is:

1. A foamed product which is formed from the admixture of:
  a) a first component comprising an organic isocyanate;
  b) a second component comprising a Mannich polyol, said Mannich polyol having a hydroxy number in the range of 250–340 and a viscosity of 3500 cps or less, and wherein said Mannich polyol is derived from nonylphenol, formaldehyde, an alkanolamine, and propylene oxide as the sole alkoxylating agent.

2. A foamed product according to claim 1 wherein said second component further comprises water in an effective carbon dioxide generating amount by virtue of its reaction with isocyanate in said first component.

3. A foamed product according to claim 2 wherein at least 50% by volume of the total amount of blowing gas present during foam production is carbon dioxide that is derived from the reaction of isocyanate with water.

4. A foamed product according to claim 2 wherein said first component and said second component are mixed in the presence of a gaseous blowing agent.

5. A foamed product according to claim 4 wherein said gaseous blowing agent is selected from the group consisting of: hydrocarbons having fewer than 7 carbon atoms, or halogenated hydrocarbons.

6. A foamed product according to claim 1 wherein said isocyanate is selected from the group consisting of: MDI or TDI.

7. A foamed product according to claim 1 wherein said alkanolamine comprises diethanolamine.

8. A foamed product according to claim 1 wherein said alkanolamine comprises a mixture of diethanolamine and monoethanolamine.

9. A Mannich condensate polyol product comprising a mixture of:

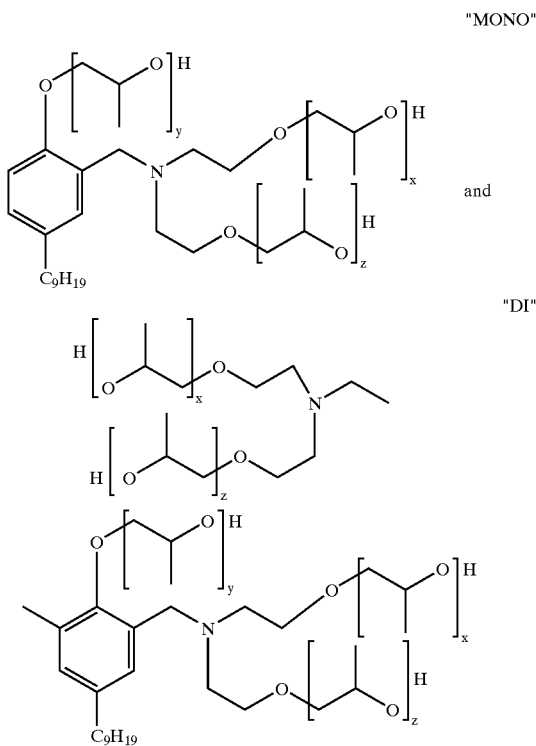

, said mixture being derived from:
  a) nonylphenol,
  b) formaldehyde,
  c) an alkanolamine selected from the group consisting of: diethanolamine, or mixtures of diethanolamine with monoethanolamine; and
  d) propylene oxide as the sole alkoxylating agent, wherein said mixture has a hydroxy number in the range of 250–340 and a viscosity of 3500 cps or less.

10. A product according to claim 9 wherein the ratio of MONO/DI in said mixture is any ratio in the range of between 10/90 to 70/30.

11. A product according to claim 9 wherein the sum of x+y+z is any number in the range of 5 to 20, including every whole integer therebetween.

12. A product according to claim 9 wherein the sum of x+y+z is any number in the range of 5 to 10, including every whole integer therebetween.

* * * * *